Sept. 4, 1962  G. F. LESHER  3,052,002
STRINGER HOLDER
Filed Sept. 30, 1960
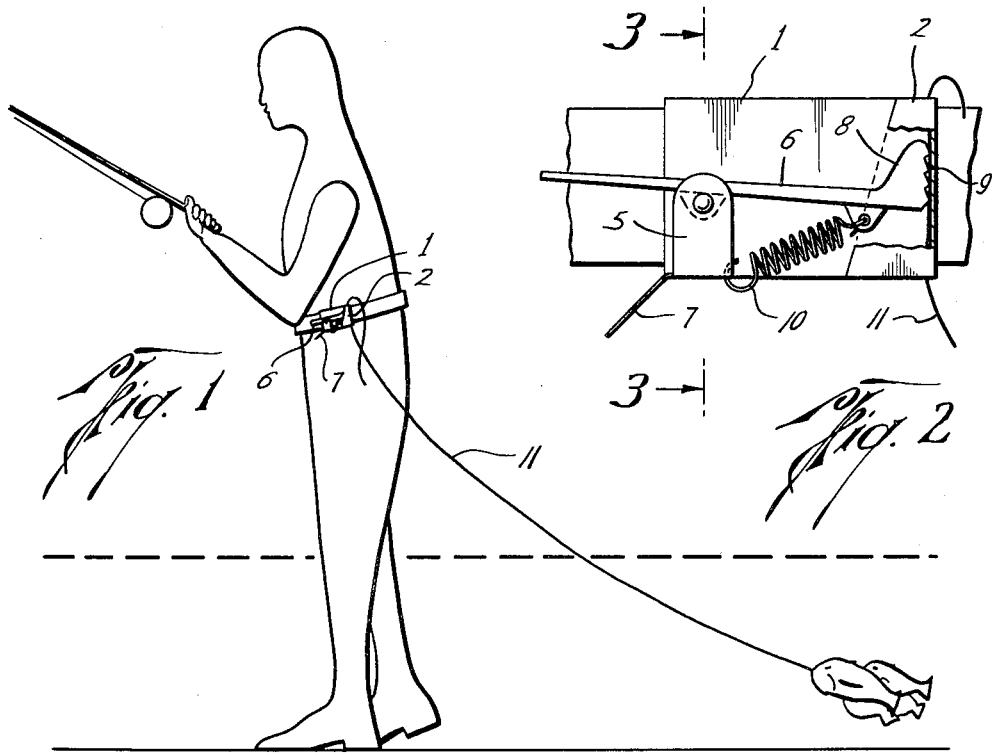
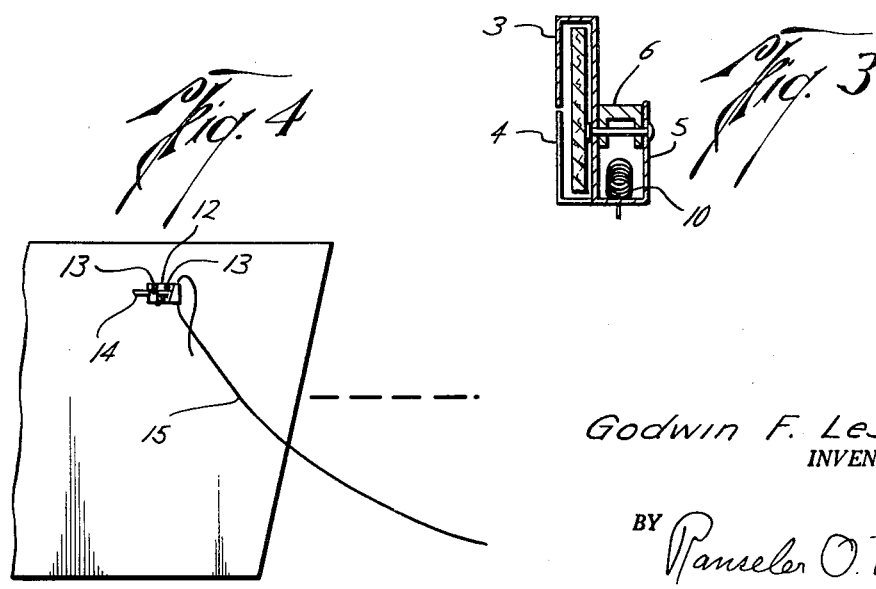
Godwin F. Lesher
INVENTOR.
BY Ranseler O. Wyatt
ATTORNEY

United States Patent Office 3,052,002
Patented Sept. 4, 1962

3,052,002
STRINGER HOLDER
Godwin F. Lesher, 115 Santa Fe, Houston, Tex.
Filed Sept. 30, 1960, Ser. No. 59,680
1 Claim. (Cl. 24—3)

This invention relates to new and useful improvements in a stringer holder.

It is an object of this invention to provide a means for securing a stringer, as is used in retaining fish caught by a sporting fisherman.

In sport fishing, such as in floundering, or wade fishing, the fisherman usually retains the fish caught by stringing them on a stringer and tying the stringer to his belt or around his body. This often causes considerable difficulty, particularly where the fisherman has a fishing gig, or a rod, in one hand, and is faced with the necessity of untying the stringer and stringing the fish on the stringer and then retying the stringer. It is an object of this invention to provide a means for holding one end of the stringer and quickly and easily releasing the stringer for mounting a fish thereon and again securing the stringer.

With the above and other objects in view, the invention has relation to certain novel features of construction, operation and arrangement of parts more particularly defined in the following specifications and illustrated in the accompanying drawings, wherein:

FIGURE 1 is a side elevational view of the device mounted on the belt of a user, with a stringer attached.

FIGURE 2 is a side elevational view of the device, partially in cross section.

FIGURE 3 is a cross sectional end view taken on the line 3—3 of FIGURE 2, and

FIGURE 4 is a side elevational view of a modified form of the device.

Referring now more particularly to the drawings, the numeral 1 designates the framework of the device which may be stamped from a sheet of rigid material, one end bent outwardly and rearwardly to form the guard 2 and having the portions 3, 4 bent outwardly in one direction and inwardly forming a belt receiving channel, and a portion 5 bent outwardly in the other direction and upwardly, forming a lever bracket member on which the lever 6 is pivotally mounted. A rigid handle 7 extends rearwardly and downwardly from the framework, beneath the extended end of the lever 6. The other end of the lever 6 is enlarged as at 8 and the end face of the enlarged portion is provided with gripping means such as the horizontal grooves 9. A suitable tension means as the spring 10 constantly urges the grooved face of the lever 6 downwardly abutting the end wall formed by the overturned portion 2 of the framework, one end of the spring 10 being secured to the lever 6 adjacent the enlarged portion 8 and the other end of the spring 10 being secured to the outwardly extended portion of the bracket 5.

In use the fisherman passes his belt through the channel formed by the members 3, 4 and grips the extended end of the lever 6 and the handle 7 and presses the end of the lever 6 downwardly, raising the enlarged portion 8 of the lever 6 off of the end wall of the member 2 and a stringer as 11 is passed between the enlarged portion 8 of the lever 6 and the end wall of the portion 2 and the lever 6 then released, the grooved face of the enlarged portion 8 of the lever 6 moving into contact with the stringer 11 and clamping same tightly against the framework 2. When it is desired to string a fish, the user need only press the lever 6 downwardly and the stringer will be released and after a fish has been placed on the stringer, the stringer may again be mounted in the holder as above explained.

In the form shown in FIGURE 4, the portions 3, 4 have been removed and the framework 12 provided with countersunk ports 13, 13 to receive screws for mounting the framework 12 on the side of a boat. The lever 14 may be depressed to release and to mount a stringer as 15, in the same manner as described for the device shown in FIGURES 1 to 3.

While the foregoing are considered preferred forms of the invention, they are by way of illustration only, the broad principle of the invention being defined by the appended claim.

What I claim is:

In a stringer holder, a flat, longitudinal rigid framework, said framework being bent to form a belt receiving loop parallel with one longitudinal face of said framework, a portion of said framework being bent outwardly and then rearwardly forming a vertical guard, another portion of said framework being bent outwardly and upwardly to form a bracket, a lever extending longitudinally and parallel with the other face of said framework pivotally mounted in said bracket, one end of said lever extending outwardly beyond one end of said framework and a portion of said framework forming said bracket being bent downwardly and rearwardly to provide a handle adjacent the extended end of said lever and the other end of said lever being enlarged and serrated on its end face forming a stringer clamping means, said enlarged end abutting against said guard and having yieldable means secured at one end to said bracket and the other end to said lever adjacent said enlarged end maintaining said enlarged end in contact with said guard to anchor a stringer extended vertically between said guard and the enlarged end of said lever.

References Cited in the file of this patent

UNITED STATES PATENTS

| | | |
|---|---|---|
| 702,648 | Hand | June 17, 1902 |
| 1,692,712 | Tannebaum | Nov. 20, 1928 |
| 1,725,324 | Whitehead | Aug. 20, 1929 |
| 1,797,098 | Minehart | Mar. 17, 1931 |
| 2,212,756 | Stewart | Aug. 27, 1940 |
| 2,749,075 | Altergott | June 5, 1956 |
| 2,775,804 | Ayoub | Jan. 1, 1957 |
| 2,959,884 | Le May | Nov. 15, 1960 |